(12) United States Patent
Clark et al.

(10) Patent No.: US 11,809,941 B1
(45) Date of Patent: Nov. 7, 2023

(54) VARIABLE RFID TRANSMIT POWER ADJUSTMENT BASED ON SURROUNDING ENVIRONMENT TO ENHANCE TAG DETECTION FIELD

(71) Applicant: Sensormatic Electronics, LLC, Boca Raton, FL (US)

(72) Inventors: John J. Clark, Boynton Beach, FL (US); Adam S. Bergman, Boca Raton, FL (US); Manuel A. Soto, Lake Worth, FL (US); John A. Allen, Pompano Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/725,062

(22) Filed: Apr. 20, 2022

(51) Int. Cl.
  *G06K 7/10* (2006.01)
  *G08B 21/18* (2006.01)

(52) U.S. Cl.
  CPC ....... *G06K 7/10217* (2013.01); *G08B 21/182* (2013.01)

(58) Field of Classification Search
  CPC .......................... G06K 7/10217; G08B 21/182
  See application file for complete search history.

(56) References Cited

U.S. PATENT DOCUMENTS

| | | | |
|---|---|---|---|
| 6,600,418 B2 | 7/2003 | Francis et al. | |
| 8,519,823 B2* | 8/2013 | Rinkes | G06K 7/10217 340/505 |
| 9,460,325 B2* | 10/2016 | Hori | G06K 7/10217 |
| 2005/0083181 A1* | 4/2005 | Jalkanen | G06K 7/0008 340/10.34 |
| 2008/0174410 A1* | 7/2008 | Sarangapani | G06K 7/0008 340/572.1 |
| 2009/0045913 A1* | 2/2009 | Nelson | G06K 7/0008 340/539.11 |
| 2009/0179738 A1* | 7/2009 | Kageyama | G06K 7/10217 340/10.1 |
| 2013/0120119 A1* | 5/2013 | Calvarese | G06K 7/10217 340/10.5 |
| 2021/0027608 A1* | 1/2021 | Shakedd | G08B 21/24 |

OTHER PUBLICATIONS

International Search Report and Written Opinion in PCT/US2023/065759, dated Aug. 1, 2023, 13 pages.

* cited by examiner

*Primary Examiner* — Tuyen K Vo
(74) *Attorney, Agent, or Firm* — ARENTFOX SCHIFF LLP

(57) ABSTRACT

A method for operating a sensor includes receiving identification information from one or more electronic identification devices (EIDs) located in a vicinity of the sensor. A number of EIDs located in the vicinity of the sensor is determined based on the received identification information. A determination is made if the number of EIDs located in the vicinity of the sensor exceeds a first predefined threshold. Transmission power to the sensor is selectively adjusted based on the number of EIDs with respect to the first predefined threshold, in response to determining that the number of EIDs located in the vicinity of the sensor exceeds or is less than any number of predefined thresholds.

16 Claims, 5 Drawing Sheets

VARIABLE RFID TRANSMIT POWER ADJUSTMENT BASED ON SURROUNDING ENVIRONMENT TO ENHANCE TAG DETECTION FIELD

FIELD

The present disclosure relates generally to security tags, such as an electronic article surveillance tag, which may be attached to or incorporated into an article. More particularly, the present disclosure relates to a method for variable Radio Frequency IDentification (RFID) transmit power adjustment based on surrounding environment to enhance tag detection.

BACKGROUND

Electronic Article Surveillance (EAS) systems are commonly used in retail stores and other settings to prevent the unauthorized removal of goods from a protected area, e.g., the retail store. Typically, a detection system is configured at an exit from the protected area, which comprises one or more transmitters and antennas ("pedestals") capable of generating an electromagnetic field across the exit, known as the "interrogation zone." Articles to be protected are tagged with a security tag (such as an RFID and/or an acousto-magnetic (AM) tag), also known as an EAS marker and Electronic Identification Device (EID), that, when active, generates a response signal when passed through this interrogation zone. An antenna and receiver in the same or another "pedestal" detects this response signal and generates an alarm.

Additionally, permanent hidden/embedded tags in goods could be used for other purposes, such as, but not limited to circular economy applications (new business models like renting clothes, or selling second hand clothes with known authenticity and pedigree). In many cases the same tag may be used for multiple purposes: security (anti-theft) circular economy, supply chain management and inventory management.

One drawback of tagging goods with EAS markers and other security tags for purposes of theft prevention is that there may be considerable performance degradations in security tag detections when a large number of security tags are located in close proximity of the EAS system. In retail shopping environment, items having security tags are often moved to different locations within the retail store. For example, retail stores typically relocate items in the front of a store, e.g., near egresses, to attract customers.

Thus, improvements in methods for operating security tags are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for automatically adjusting RFID reader transmit power based on environmental changes.

In an aspect, a method for operating a sensor includes receiving identification information from one or more electronic identification devices (EIDs) located in a vicinity of the sensor. A number of EIDs located in the vicinity of the sensor is determined based on the received identification information. A determination is made if the number of EIDs located in the vicinity of the sensor exceeds a first predefined threshold. Transmission power to the sensor is selectively adjusted based on the number of EIDs with respect to the first predefined threshold, in response to determining that the number of EIDs located in the vicinity of the sensor exceeds the first predefined threshold.

In another aspect, a system for operating a sensor includes a hardware processor and memory including instructions that, when executed by the hardware processor, cause the system to receive identification information from one or more electronic identification devices (EIDs) located in a vicinity of a sensor; determine a number of EIDs located in the vicinity of the sensor based on the received identification information; determine if the number of EIDs located in the vicinity of the sensor exceeds a first predefined threshold; and selectively adjust transmission power to the sensor based on the number of EIDs with respect to the first predefined threshold, in response to determining that the number of EIDs located in the vicinity of the sensor exceeds the first predefined threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods for automatically adjusting RFID reader transmit power based on RFID tag environment changes. The power for transmission of signals may be increased or reduced based on the visible RFID tags that are being tracked by a single or multiple RFID reader EAS system. Moreover, such power adjustments may control the number of visible RFID tags to the RFID EAS system. In some aspects, the disclosed method provides an advantage in various environments over fixed power RFID EAS systems that may have performance degradations when a large number of RFID tags are located in close proximity of the RFID EAS system.

Turning now to the figures, example aspects are depicted with reference to one or more components described herein, where components in dashed lines may be optional.

Figure 1:
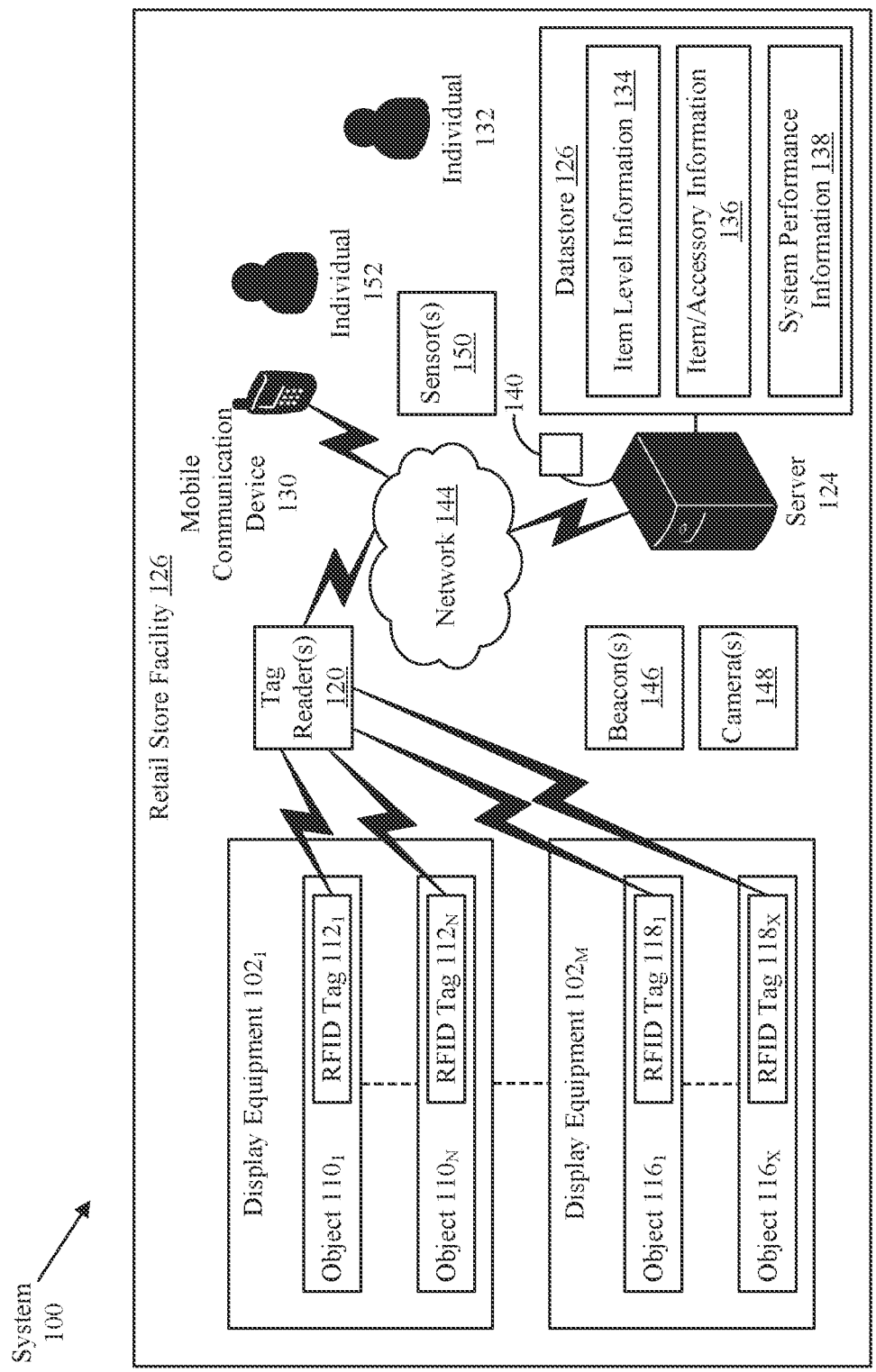
FIG. 1 is an illustration of an example architecture for a system according to some present aspects.

Referring now to FIG. 1, there is provided a schematic illustration of an illustrative system 100 that is useful for understanding the present solution. The present solution is described herein in relation to a retail store environment. The present solution is not limited in this regard and may be used in other environments. For example, the present solution may be used in distribution centers, factories and other commercial environments. Notably, the present solution may be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment $102_1$-$102_M$ is disposed. The display equipment is provided for displaying objects (or items) $110_1$-$110_N$, $116_1$-$116_X$ to customers of the retail store. The display equipment may include, but is not limited to, shelves, racks, article display cabinets, promotional displays, fixtures, and/or equipment se-curing areas of the RSF 128. The RSF 128 may also include emergency equipment (not shown), checkout counters, video cameras, people counters, and conventional EAS systems well known in the art, and therefore will not be described herein.

At least one tag reader 120 is provided to assist in counting and tracking locations of the objects $110_1$-$110_N$, $116_1$-$116_X$ within the RSF 128. The tag reader 120 comprises an RFID reader configured to read RFID tags.

RFID tags $112_1$-$112_N$, $118_1$-$118_X$ are respectively secured to the objects $110_1$-$110_N$, $116_1$-$116_X$ as described below. The RFID tags $112_1$-$112_N$, $118_1$-$118_X$ may alternatively or additionally comprise dual-technology tags that have both EAS and RFID capabilities as described herein.

Notably, the tag reader 120 is strategically placed at a known location within the RSF 128, for example, at an exit/entrance. By correlating the tag reader's RFID tag reads and the tag reader's known location within the RSF 128, it is possible to determine the general location of objects $110_1$, . . . , $110_N$, $116_1$, . . . , $116_X$ within the RSF 128. The tag reader's known coverage area also facilitates object location determinations. Accordingly, RFID tag read information and tag reader location information is stored in a datastore 126. This information may be stored in the datastore 126 using a server 124 and network 144 (e.g., wired network, i.e. an Intranet and/or Internet, and/or wireless network).

System 100 may include one or more Mobile Communication Devices ("MCD") 130. MCD 130 may include, but is not limited to, a cell phone, a smart phone, a table computer, a personal digital assistant, and/or a wearable device (e.g., a smart watch). In accordance with some examples, the MCD 130 has a software application installed thereon that is operative to: facilitate the provision of various information 134-138 to the individual 152 and/or to facilitate a purchase transaction.

The MCD 130 is generally configured to provide a visual and/or auditory output of item level information 134, accessory information 136, and/or system performance information 142.

The MCD 130 may also be configured to read barcodes and/or RFID tags. Information obtained from the barcode and/or RFID tag reads may be communicated from the MCD 130 to the server 124 via network 144. Similarly, the stored information 134-138 is provided from the server 124 to the MCD 130 via network 144. The network 144 may include an Intranet and/or the Internet.

The server 124 may be local to the facility 128 as shown in FIG. 1 or remote from the facility 128. It should be understood that server 124 is configured to: write data to and read data from datastore 126, RFID tags $112_1$-$112_N$, $118_1$-$118_X$, and/or MCD 130; perform language and currency conversion operations using item level information 134 and/or accessory information 136 obtained from the datastore 126, RFID tags $112_1$-$112_N$, $118_1$-$118_X$, and/or MCD 130 perform system monitoring based on tag read information, MCD tacking information, and/or information 134-138; perform image processing using images captured by camera(s) 148; and/or determine locations of RFID tags $112_1$-$112_N$, $118_1$-$118_X$ and/or MCDs 130 in the RSF 128 using beacon(s) 146, tag reader 120 or other devices having known locations and/or antenna patterns.

In some examples, one or more beacons 146 transmitting an RF signal (e.g., a second RF signal that is non-RFID) other than the RFID interrogation signal are placed to cover a zone of interest also covered by a tag reader 120 placed to cover an RFID interrogation zone, e.g., at a portal of the retail facility 128. The system 100 may detect and derive any number of relevant indicators based on second RF signal. The tag 112/118 response to the second RF signal is analyzed and compared to data collected by the RFID signal response that occurred concurrently with the tag's passage through the portal.

The server 124 facilitates, updates the information 134-138 output from the MCD 130. Such information updating may be performed periodically, in response to instructions received from an associate (e.g., a retail store employee 132), in response to a detected change in the item level 134, accessory 136 and/or system performance information 138, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag 112/118. The sale price is then output from the MCD 130. The present solution is not limited to the particulars of this example.

Although a single MCD 130 and/or a single server 124 is (are) shown in FIG. 1, the present solution is not limited in this regard. It is contemplated that more than one computing device may be implemented. In addition, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information 134 includes, but is not limited to, first information indicating that an RFID tag 112/118 is in motion or that an object is being handled by an individual 152, second information indicating a current location of the RFID tag 112/118 and/or the MCD 130, third information indicating an accessory or related product of the object to which the moving RFID tag is coupled, and/or fourth information indicating the relative locations of the accessory and the moving RFID tag 112/118 and/or the relative locations of the related product and the moving RFID tag 112/118. The first, second and fourth information may be derived based on sensor data generated by sensors local to the RFID tag. Accordingly, the RFID tags $112_1$-$112_N$, $118_1$-$118_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information may be stored local to the RFID tag(s) or in a remote datastore 126 as information 136.

In an aspect, the server's 124 performance monitoring module 140 facilitates collection of information about the performance of an RFID system. In a particular aspect, this performance monitoring may be achieved, in part, by collecting information from a number of reader stations in the RFID system. Once collected, such information may be analyzed by the performance monitoring module 140 to statistically correlate system performance with the collected information, including time. One of the monitored environmental parameters may include a count of RFID tags 112/118 within the interrogation zone of each tag reader 120. By identifying relationships between RFID system performance and environmental parameters, solutions may be targeted to mitigate their effects.

The performance monitoring module 140 may be configured to send a number of control signals to effect corrective action(s) to improve EAS RFID system performance, and/or to report processed analytical results to external systems or to human operators. For example, one control signal may be coupled with one of the tag readers 120 to allow the performance monitoring module 140 to adjust the power level of the RF signal received by that tag reader 120. On one hand, the tag reader's 120 power level may be reduced, for example, to reduce unintentional interference with other readers and to avoid reading tags that are not intentionally within the interrogation zone of the reader. On the other hand, reader power level may be increased to increase the likelihood of reading all tags in the interrogation zone of the tag reader 120. Advantageously, whether power level should be increased or decreased to improve RFID system performance may be determined from analysis of the data collected by the performance monitoring module 140. In an aspect, the performance monitoring module 140 may keep track of the number of RFID tags located within the interrogation zone of each tag reader 120.

The performance monitoring module 140 may also be coupled to the datastore 126. In this example, the datastore 126 may provide a repository for data collected by the performance monitoring module 140, such as system performance information 138. When handling either product or performance-related data that is associated with a particular tag, the performance monitoring module 140 may store the processed information in a way that uniquely associates the information with a stored tag identifier, such as an EPC.

Figure 2:
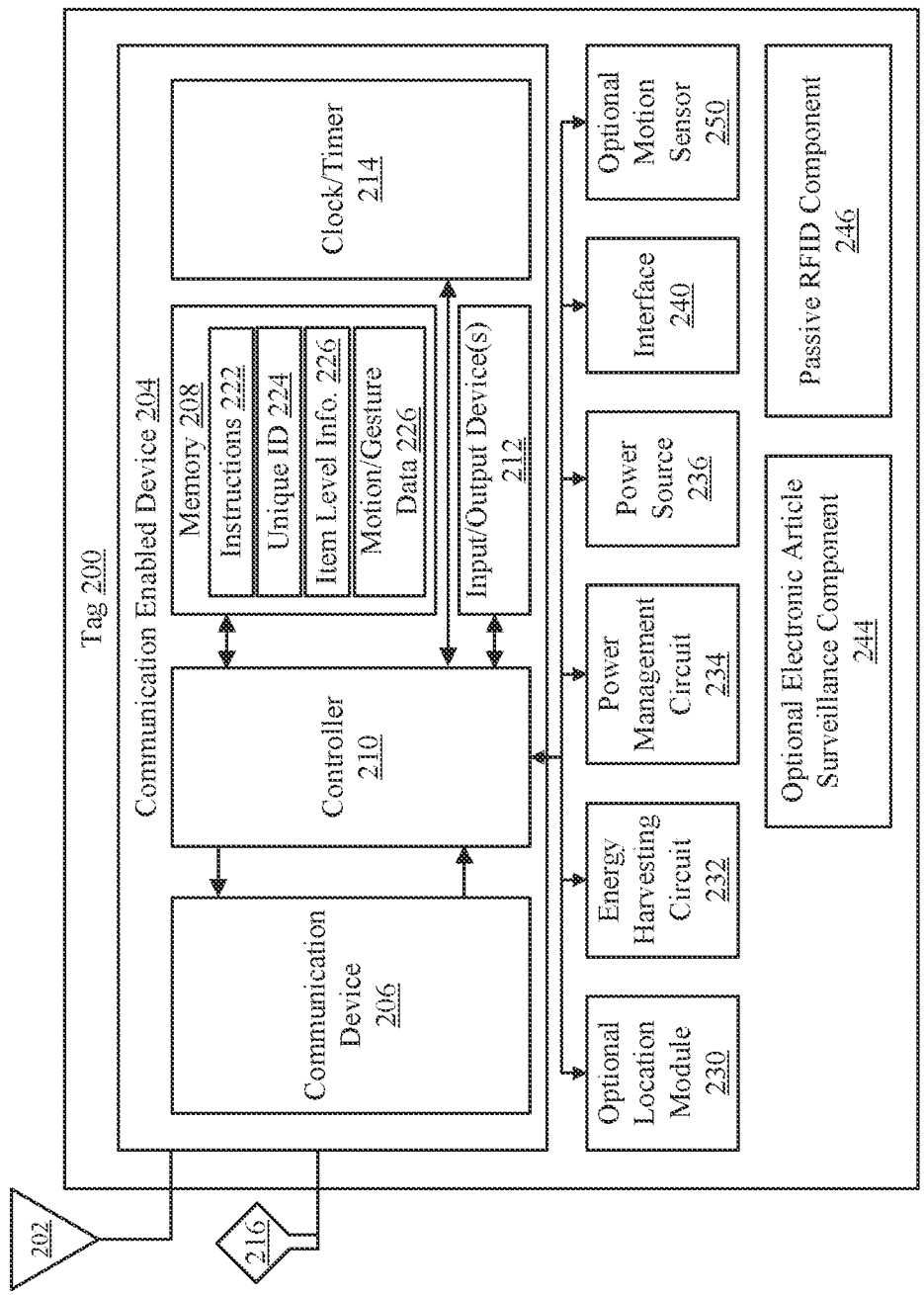
FIG. 2 is an illustration of an example architecture for a security tag according to some present aspects.

Referring now to FIG. 2, there is an illustration of an illustrative architecture for a security tag 200. RFID tags $112_1$-$112_N$, $118_1$-$118_X$ are the same as or similar to security tag 200. As such, the discussion of security tag 200 is sufficient for understanding the RFID tags $112_1$-$112_N$, $118_1$-$118_X$ of FIG. 1. In some implementations, security tag 200 may be configured to perform operations such as but not limited to (a) minimize power usage so as to extend a power source's life (e.g., a battery or a capacitor), (b) minimize collisions with other tags so that the tag of interest may be seen at given times, (c) optimize useful information within an inventory system (e.g., communicate useful change information to a tag reader), and/or (d) optimize local feature functions.

The security tag 200 may include more or less components than that shown in FIG. 2. However, the components shown are sufficient to disclose an illustrative aspect implementing the present solution. Some or all of the components of the security tag 200 may be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 is representative of a security tag 200 configured to facilitate improved inventory management/surveillance and customer experience. In this regard, the security tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology may include, but is not limited to, a RFID technology, a Near Field Communication ("NFC") technology, and/or a Short Range Communication ("SRC") technology. For example, one or more of the following wireless communication technologies (is) are employed: Radio Frequency ("RF") communication technology; Bluetooth technology (including Bluetooth Low Energy (LE)); WiFi technology; beacon technology; and/or LiFi technology. Each of the listed wireless communication technologies is well known in the art, and therefore will not be described in detail herein. Any known or to be known wireless communication technology or other wireless communication technology may be used herein without limitation.

The components 206-214 shown in FIG. 2 may be collectively referred to herein as a communication enabled device 204 and include a memory 208 and a clock/timer 214. Memory 208 may be a volatile memory and/or a non-volatile memory. For example, the memory 208 may include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR may be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols may be downloaded to the device at any given time. The initial/default role (being an RFID, WiFi, LiFi, etc. tag) may be assigned at the deployment thereof. If the user desires to use another protocol later, the user may remotely change the communication protocol of the deployed security tag 200. The update of the firmware, in case of issues, may also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external device and/or transmit signals generated by the communication enabled device 204. The antenna 202, 216 may comprise a near-field or far-field antenna. Each antenna may include, but is not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 116 of FIG. 1) to which the security tag 200 is attached.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT may be determined based on environmental conditions (e.g., humidity, temperature, time of day, relative distance to a location device (e.g., beacon or location tag), etc.) and/or system conditions (e.g., amount of traffic, interference occurrences, etc.). In this regard, the security tag 200 may include additional sensors not shown in FIG. 2.

The communication enabled device 204 facilitates the automatic and dynamic modification of item level information 226 that is being or is to be output from the security tag 200 in response to certain trigger events. The trigger events may include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the security tag 200 may be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled device 204 may communicate information specifying a timestamp, a unique identifier for an item, item description, item price, a currency symbol and/or location information to an external device. The external device (e.g., server 124 or MCD 130) may then store the information in a database (e.g., datastore 126 of FIG. 1) and/or use the information for various purposes.

The communication enabled device 204 also comprises a controller 210 (e.g., a CPU) and input/output devices 212. The controller 210 may execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 may also reside, completely or at least partially, within the controller 210 during execution thereof by the security tag 200. The memory 208 and the controller 210 also may constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the security tag 200 and that cause the security tag 200 to perform any one or more of the methodologies of the present disclosure.

The input/output devices may include, but are not limited to, a display (e.g., an LCD display and/or an active matrix display), a speaker, a keypad, and/or light emitting diodes. The display is used to present item level information 226 in a textual format and/or graphical format. Similarly, the speaker may be used to output item level information 226 in an auditory format. The speaker and/or light emitting diodes may be used to output alerts for drawing a person's attention to the security tag 200 (e.g., when motion thereof has been detected) and/or for notifying the person of a particular pricing status (e.g., on sale status) of the item to which the tag is attached.

The clock/timer 214 is configured to determine a date, a time, and/or an expiration of a predefined period of time. Technique for determining these listed items are well known in the art, and therefore will not be described herein. Any known or to be known technique for determining these listed items may be used herein without limitation.

The security tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location may be used herein without limitation including relative positioning within a facility or structure.

The security tag 200 may also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component may be used herein without limitation. The power source 236 may include, but is not limited to, a rechargeable battery and/or a capacitor.

As described herein, in some aspects, the EAS component 244 disposed in the security tag 200 may be any type of article surveillance mechanism, or combinations thereof. For example, in an aspect, the EAS component 244 may be an EAS sensor and/or an RFID sensor. In some further aspects, the EAS component 244 may include more than one sensor of the same type or of different types. For example, in one non-limiting aspect, the security tag 200 may have dual technology functionality (both RFID and EAS).

In an aspect, the EAS sensor may be a sensor of the type used in Acousto Magnetic (AM) systems. In one non-limiting aspect, for example, the detectors in an AM system emit periodic bursts at 58 KHz, which causes a detectable resonant response in an AM tag. A security tag in a 58 KHz system may also be implemented as an electric circuit resonant at 58 kHz. In an aspect, the EAS sensor to be incorporated into the security tag 200 may have a small and substantially flat form factor, and may have a degree of flexibility.

As shown in FIG. 2, the security tag 200 further comprises an energy harvesting circuit 232 and a power management circuit 234 for ensuring continuous operation of the security tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device may continue to charge despite the depletion of a source of energy. Energy harvesting circuits are well known in the art, and therefore will not be described herein. Any known or to be known energy harvesting circuit may be used herein without limitation.

As noted above, the security tag 200 may also include a motion sensor 250. Motion sensors are well known in the art, and therefore will not be described herein. Any known or to be known motion sensor may be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it may notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data may be compared to stored motion/gesture data 228 to determine if a match exists therebetween. More specifically, a motion/gesture pattern specified by the sensor data may be compared to a plurality of motion/gesture patterns specified by the stored motion/gesture data 228. The plurality of motion/gesture patterns may include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the security tag 200 to selectively enable the communication device 206 (e.g., transceiver) or at least one communications operation only when the tag's location within a facility is actually being changed (e.g., and not when a fan is causing the tag to simply vibrate).

In some scenarios, the security tag 200 may be also configured to enter a sleep state in which at least the motion sensor triggering of communication operations is disabled. This is desirable, for example, in scenarios when the security tag 200 is being shipped or transported from a distributor to a customer. In those or other scenarios, the security tag 200 may be further configured to enter the sleep state in response to its continuous detection of motion for a given period of time. The tag may be transitioned from its sleep state in response to expiration of a defined time period, the tag's reception of a control signal from an external device, and/or the tag's detection of no motion for a period of time.

The power management circuit 234 is generally configured to control the supply of power to components of the security tag 200. In the event all of the storage and harvesting resources deplete to a point where the security tag 200 is about to enter a shutdown/brownout state, the power management circuit 234 may cause an alert to be sent from the security tag 200 to a remote device (e.g., tag reader 120 or server 124 of FIG. 1). In response to the alert, the remote device may inform an associate (e.g., a store employee 132 of FIG. 1) so that (s) he may investigate why the security tag 200 is not recharging and/or holding charge.

The power management circuit 234 is also capable of redirecting an energy source to the security tag's 200 electronics based on the energy source's status. For example, if harvested energy is sufficient to run the security tag's 200 function, the power management circuit 234 confirms that all of the security tag's 200 storage sources are fully charged such that the security tag's 200 electronic components may be run directly from the harvested energy. This ensures that the security tag 200 always has stored energy in case harvesting source(s) disappear or lesser energy is harvested for reasons such as drop in RF, light or vibration power levels. If a sudden drop in any of the energy sources is detected, the power management circuit 234 may cause an alert condition to be sent from the security tag 200 to the remote device (e.g., tag reader 120 or server 124 of FIG. 1). At this point, an investigation may be required as to what caused this alarm. Accordingly, the remote device may inform the associate (e.g., a store employee 132 of FIG. 1) so that he/she may investigate the issue. It may be that other merchandise are obscuring the harvesting source or the item is being stolen.

The present solution is not limited to that shown in FIG. 2. The security tag 200 may have any architecture provided that it may perform the functions and operations described herein. For example, all of the components shown in FIG. 2 may comprise a single device (e.g., an Integrated Circuit ("IC")). Alternatively, some of the components may comprise a first tag element (e.g., a Commercial Off The Shelf ("COTS") tag) while the remaining components comprise a second tag element communicatively coupled to the first tag element. The second tag element may provide auxiliary functions (e.g., motion sensing, etc.) to the first tag element. The second tag element may also control operational states of the first tag element. For example, the second tag element may selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change may be achieved by changing the binary value of at least one state bit (e.g., from 0 to 1, or vice versa) for causing certain communication control operations to be performed by the security tag 200. Additionally or alternatively, a switch may be actuated for creating a closed or open circuit. The present solution is not limited in this regard.

In some examples, security tag 200 includes an RFID subsystem, such as communication-enabled device 204 described above, operative to receive an RFID interrogation signal and respond with an RFID response. Such security tags 200 include a non-RFID RF subsystem, also incorporated into communication enabled device 204, operative to receive a non-RFID RF signal and respond by wirelessly indicating that the non-RFID subsystem received the non-RFID RF signal. In some such examples, the non-RFID subsystem responds that the non-RFID RF subsystem received the non-RFID RF signal by one of: allowing the RFID subsystem to respond to the RFID interrogation signal with an RFID response only upon the non-RFID RF subsystem having received a non-RFID RF signal concurrently; supplementing the RFID response with at least one information element indicating that the non-RFID RF subsystem received the non-RFID RF signal; and separately transmitting a non-RFID response. In some such examples, the non-RFID RF subsystem is a personal area network (PAN) signal. In some such examples, the PAN is a Bluetooth PAN.

Figure 3:
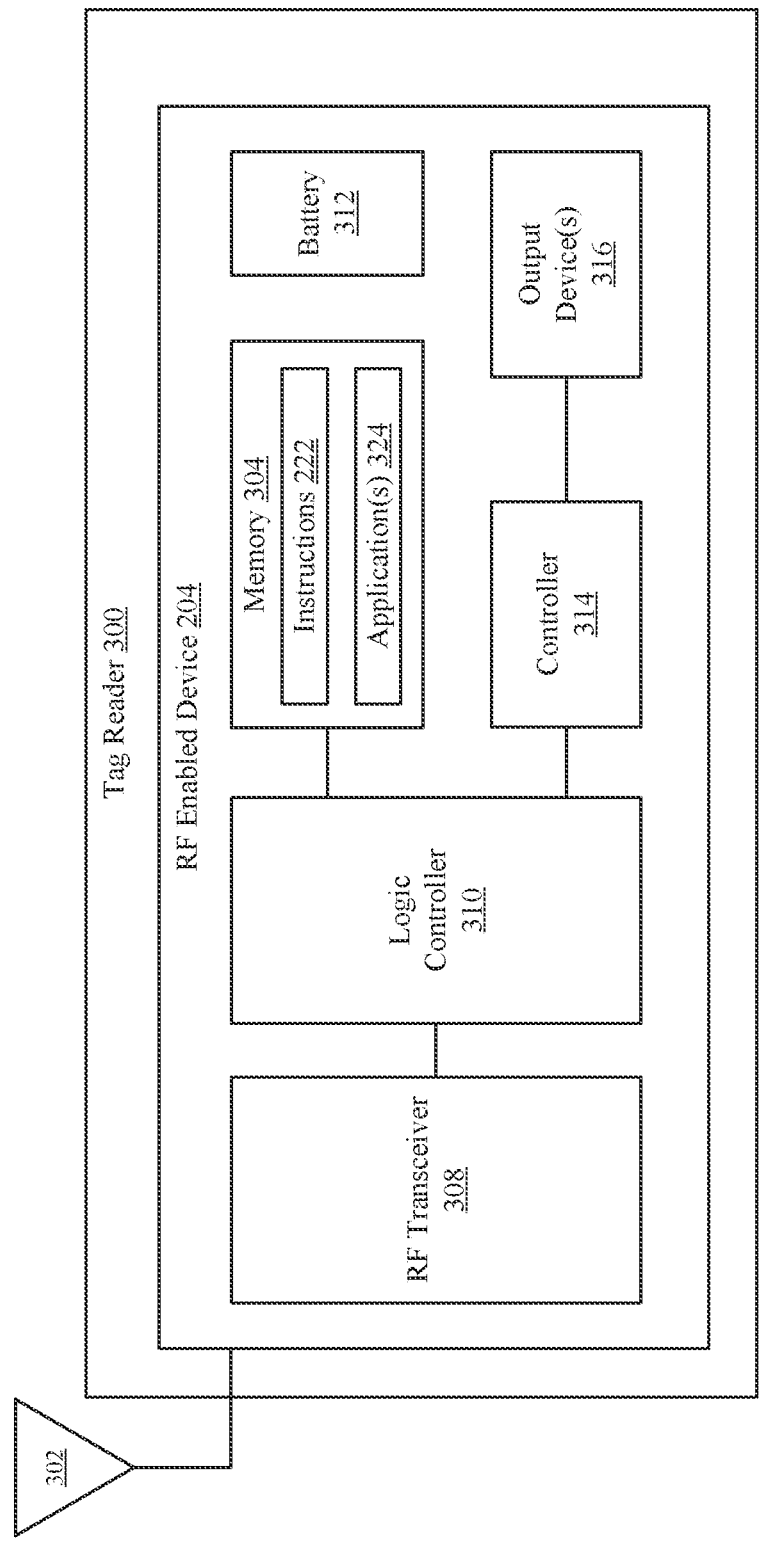
FIG. 3 is an illustration of an example architecture for a tag reader according to some present aspects.

The hardware architecture of FIG. 3 represents an illustration of a representative tag reader 300 configured to facilitate improved inventory counts and management within an RSF (e.g., RSF 128 of FIG. 1). RFID tag reader 300 is the same as or similar to tag reader 120. As such, the discussion of tag reader 300 is sufficient for understanding the RFID tag reader 120 of FIG. 1. In this regard, the tag reader 300 comprises an RF enabled device 350 for allowing data to be exchanged with an external device (e.g., RFID tags $112_1$-$112_N$, $118_1$-$118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $112_1$-$112_N$, $118_1$-$118_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. In an aspect, the RF transceiver 308 receives RF signals including information from the transmitting device, and forwards the same to a logic controller 310 for extracting the information therefrom.

The extracted information may be used to determine the presence, location, and/or type of movement of an RFID tag within a facility (e.g., RSF 128 of FIG. 1). Accordingly, the logic controller 310 may store the extracted information in memory 304, and execute algorithms using the extracted information. For example, the logic controller 310 may correlate tag reads with beacon reads to determine the location of the RFID tags within the facility. The logic controller 310 may also perform pattern recognition operations using sensor data received from RFID tags and comparison operations between recognized patterns and pre-stored patterns. The logic controller 310 may further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is (are) to be turned on when motion is detected thereby, and communicate the same to the given RFID tag. The WOT may be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 may include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time, and which RFID tags are also in zone of a second RF signal (e.g., a Bluetooth beacon or NFC or other SRC system).

Generally, simultaneous presence of a large number of RFID tags in a vicinity of the tag reader 120 may negatively impact the performance of the system by minimizing the detection of RFID tags. The performance of EAS system may be negatively affected by tag reader's 120 significant efforts to identify each of the RFID tags in its interrogation zone as well as to evaluate the information provided by these RFID tags. In an aspect, a number of RFID tags located in the vicinity of the tag reader 120 may be determined by the performance monitoring module 140 based on the received identification information from each RFID tag. In an aspect, the determined number may be tracked by the performance monitoring module 140 as a global parameter of the EAS system.

In an aspect, in order to avoid degradation in the performance of the EAS system, power level of the signals received by the RF transceiver 308 may be selectively adjusted by the performance monitoring module 140 in order to keep the tracked number of RFID tags in a specific range (e.g., not exceeding a predetermined threshold). In some implementations, the tag reader 120 may comprise a sensor gate assembly that includes a door of the RSF 128 movable between an open position allowing passage of the item (e.g., objects 110/116) along a path and a closed position inhibiting passage of the item along the path. The sensor gate assembly may be associated with one or more RFID tag readers 120. In an aspect, the adjusted transmit power level may apply to the entire sensor gate. Alternatively, transmit power to the individual tag reader's 120 may be selectively adjusted in response to a signal received from the performance monitoring module 140.

In an aspect, selective power adjustments described above control the number of visible RFID tags to the RFID EAS system. As used herein, the term "visible RFID tags" refers to one or more tags placed in proximity (e.g., within the so called interrogation zone) to the tag reader 120. When placed in proximity to the tag reader 120, the tag reader 120 may interrogate each one of the RFID tags to retrieve the matching tag data. In an aspect, automatically decreasing the power may reduce the number of tags visible to the tag reader 120, which may aid in the detection of RFID tags moving through the system and may reduce false alarms. In the case of all RFID tags being relatively far from the tag reader 120 (e.g., outside of the interrogation zone) the transmit power may automatically be increased to maximize RFID tag detection for hard to read or hidden tags moving through the RFID EAS system.

Generally, merchandise is often rearranged within retail establishments. For example, some articles that are on sale may be placed at or nearby point-of-purchase locations. Each of these articles may have RFID tags attached to them. If the tag reader 120 is located, for example, 2 meters away, it may interrogate the RFID tags attached to the sale articles on substantially continuous basis, which may prevent detection of other RFID tags in the vicinity of the tag reader 120. In an aspect, the RFID EAS system may be configured to reduce transmit power in order to optimize the system performance. It should be noted that in the aforementioned scenario once the sale articles are moved further away from the tag reader 120, the transmit power may be automatically increased back to the previous level to optimize performance of the system.

As noted above, server 124 shown in FIG. 1 may host the performance monitoring module 140 that may collect information from the RFID EAS system and other sources. The collected information may be analyzed, either by the performance monitoring module 140, or by human operators. One purpose of analyzing the collected information is to identify opportunities for improving the performance of the RFID EAS system.

In an aspect, the performance monitoring module 140 may be configured to automatically adjust the power level to continuously optimize the performance of the EAS RFID system based on the collected performance data, such as but not limited to the number of RFID tags located within the interrogation zone of each tag reader 120. In an aspect, a desirable range for a transmitted RF signal may be configurable based on environments (e.g., layout of RSF 128) in which the RFID EAS system is deployed and/or based on performance parameters of individual tag readers 120 employed by the RFID EAS system.

In an aspect, the performance monitoring module 140 may adjust the power level based on other metrics. In an aspect, the power level may be adjusted based on a number of detected false positives, based on number of reads by individual tag readers 120, based on signal to noise ratio as well as other tracked performance metrics that may be included in system performance information 138.

In an aspect, the corrective actions, such as transmit signal power adjustments may be performed on a regularly scheduled basis, or in response to an alarm condition, such as when a monitored value crosses a predetermined threshold limit. For example, the performance monitoring module 140 may include a scheduler module configured to automatically perform power adjustments based on predetermined schedules. Furthermore, if a scheduled increase in the power level of a particular tag reader 120 may result in interference with a nearby reader, the performance monitoring module 140 may also constrain the readers to multiplex, i.e. stay silent while the other reader is operating. Although this may reduce throughput of goods, the RFID performance level may be maintained, along with the benefits of RFID tracking.

Figure 4:
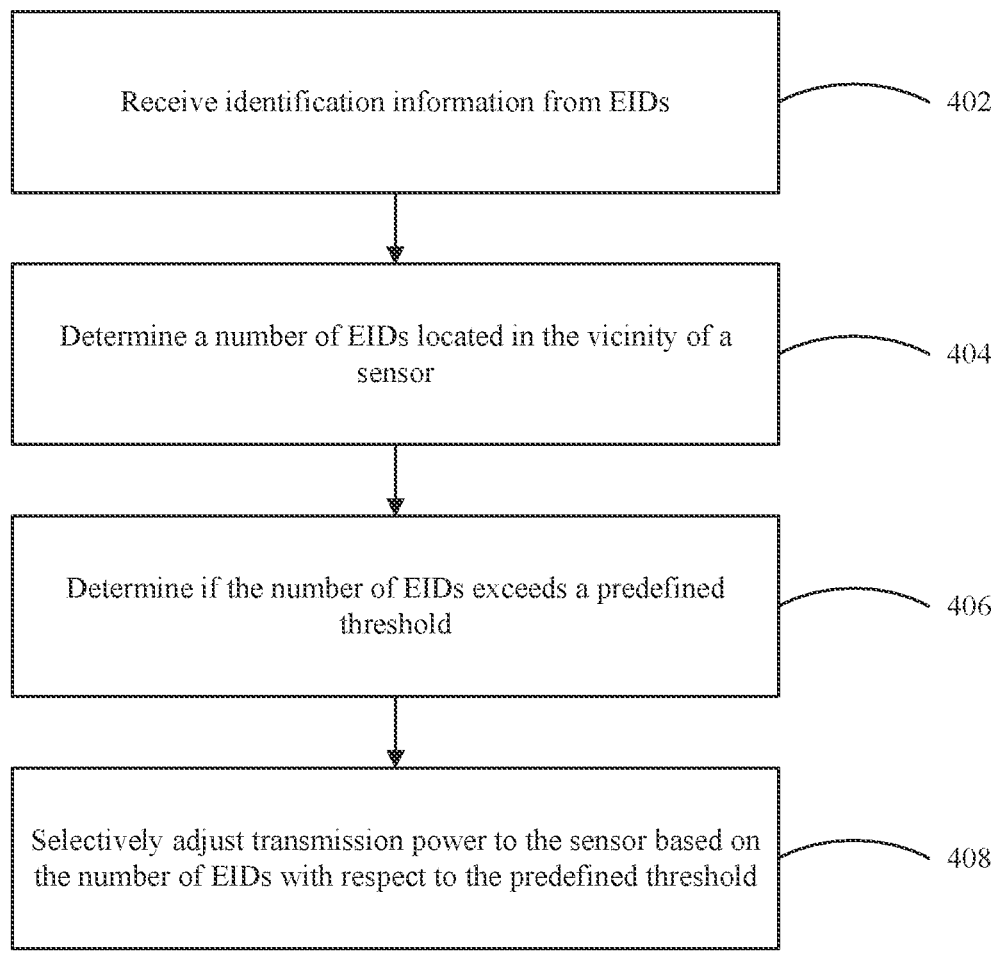
FIG. 4 is a flowchart of an example method for operating a sensor, in accordance with aspects of the present disclosure.

FIG. 4 is a flowchart of an example method for operating a sensor, in accordance with aspects of the present disclosure. FIGS. 1-3 may be referenced in combination with the flowchart of FIG. 4.

At 402, the performance monitoring module 140 may receive identification information from one or more electronic identification devices (EIDs) located in a vicinity of a sensor. In an aspect, the one or more EIDs may comprise one or more RFID tags $112_1$-$112_N$, $118_1$-$118_X$ and the sensor may comprise a tag reader 120. In addition, the performance monitoring module 140 may determine locations of RFID tags $112_1$-$112_N$, $118_1$-$118_X$ and/or MCDs 130 in the RSF 128 using beacon(s) 146, tag reader 120 or other devices having known locations and/or antenna patterns. RFID tags $112_1$-$112_N$, $118_1$-$118_X$ are respectively secured to the objects $110_1$-$110_N$, $116_1$-$116_X$ as described above. The RFID tags $112_1$-$112_N$, $118_1$-$118_X$ may alternatively or additionally comprise dual-technology tags that have both EAS and RFID capabilities as described herein. At least one tag reader 120 is provided to assist in counting and tracking locations of the objects $110_1$-$110_N$, $116_1$-$116_X$ within the RSF 128. The tag reader 120 comprises an RFID reader configured to read RFID tags. By correlating the tag reader's RFID tag reads and the tag reader's known location within the RSF 128, it is possible to determine the general location of objects $110_1, \ldots, 110_N, 116_1, \ldots, 116_X$ within the RSF 128. The tag reader's known coverage area also facilitates object location determinations. Accordingly, RFID tag read information and tag reader location information is stored in a datastore 126.

At 404, the performance monitoring module 140 may determine a number of EIDs (e.g., RFID tags 112/118) located in the vicinity of the sensor (e.g., tag reader 120) based on the received identification information and based on the information retrieved from the data store 126. In this step, the performance monitoring module 140 may utilize, for example, tag or item level information 134. Tag or item level information 134 includes, but is not limited to, first information indicating that an RFID tag 112/118 is in motion or that an object is being handled by an individual 152, second information indicating a current location of the RFID tag 112/118 and/or the MCD 130, third information indicating an accessory or related product of the object to which the moving RFID tag is coupled, and/or fourth information indicating the relative locations of the accessory and the moving RFID tag 112/118 and/or the relative locations of the related product and the moving RFID tag 112/118. The first, second and fourth information may be derived based on sensor data generated by sensors local to the RFID tag. Accordingly, the RFID tags $112_1$-$112_N$, $118_1$-$118_X$ include one or more sensors to detect their current locations, detect any individual in proximity thereto, and/or detect any motion or movement thereof.

Next, the performance monitoring module 140 may compare the computed number of EIDs (e.g., RFID tags 112/118) to a predetermined threshold at 406. In an aspect, if the number of EIDs is greater than the predetermined threshold, then the performance monitoring module 140 may reduce the power level of one or more individual tag readers 120 (at 408), for example, to reduce unintentional interference with other readers and to avoid reading tags that are not intentionally within the interrogation zone of the reader. On the other hand, reader power level may be increased (at 408) by the performance monitoring module 140 to increase the likelihood of reading all tags in the interrogation zone of the tag reader 120. Advantageously, whether power level should be increased or decreased to improve RFID system performance may be determined from analysis of the system performance information 138 collected by the performance monitoring module 140.

In other words, a method 400 for operating a sensor includes receiving identification information from one or more electronic identification devices (EIDs) located in a vicinity of a sensor. A number of EIDs located in the vicinity of the sensor is determined based on the received identification information. A determination is made if the number of EIDs located in the vicinity of the sensor exceeds a first predefined threshold. Transmission power to the sensor is selectively adjusted based on the number of EIDs with respect to the first predefined threshold, in response to determining that the number of EIDs located in the vicinity of the sensor exceeds the first predefined threshold.

In one or any combination of these aspects, the sensor comprises a Radio Frequency IDentification (RFID) reader and each of the one or more EIDs comprises a RFID tag associated with an item.

In one or any combination of these aspects, the sensor is located at a retail establishment.

In one or any combination of these aspects, the method further includes determining a number of alarms triggered by the one or more RFID tags during a predetermined period of time.

In one or any combination of these aspects, the method further includes selectively adjusting transmission power to the sensor based on the number of alarms, in response to determining that the number of alarms triggered exceeds a second predefined threshold.

In one or any combination of these aspects, the sensor comprises a gate assembly including a door of the retail establishment movable between an open position allowing passage of the item along a path and a closed position inhibiting passage of the item along the path, and wherein the sensor gate assembly is associated with one or more RFID readers.

In one or any combination of these aspects, the first predefined threshold and the second predefined threshold are selected based on optimized performance of the sensor.

In one or any combination of these aspects, selectively adjusting transmission power comprises scheduling one or more selective adjustments of transmission power based on scheduling strategy.

Figure 5:
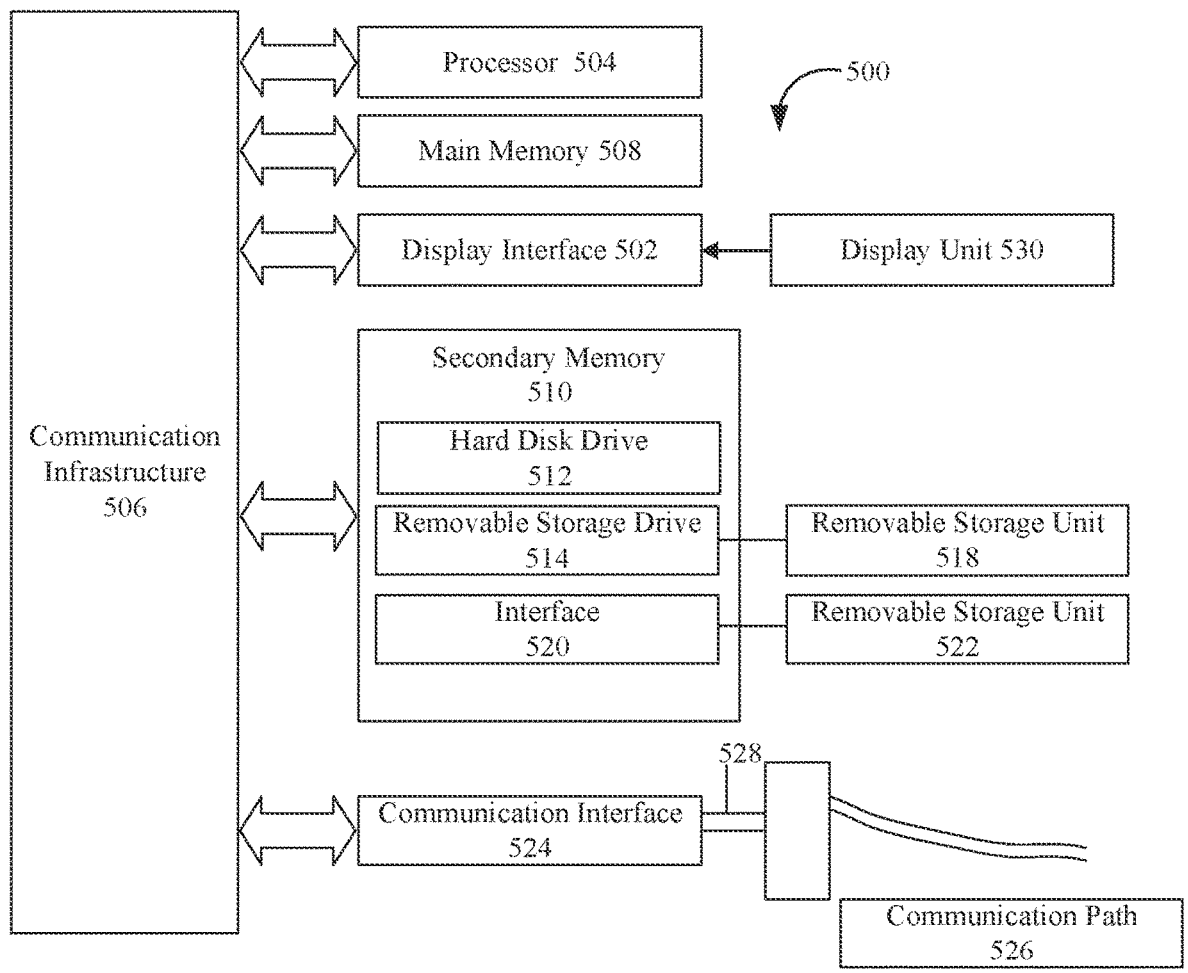
FIG. 5 is a block diagram of various hardware components and other features of an example EAS system in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 is an example of a block diagram illustrating various hardware components and other features of a computer system that may operate the performance monitoring module 140 in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 504, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 506, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP), and RS-485 interconnect among others.

Further, the connection between components of computer system 500, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method comprising:
   receiving identification information from one or more electronic identification devices (EIDs) located in a vicinity of a sensor;
   determining a number of alarms triggered by the one or more EIDs located in the vicinity of the sensor during a predetermined period of time based on the identification information;
   determining if the number of alarms exceeds a first predefined threshold; and
   selectively adjusting a transmission power to the sensor based on the number of alarms with respect to the first predefined threshold, in response to determining that the number of alarms exceeds the first predefined threshold.

2. The method of claim 1, wherein the sensor comprises a Radio Frequency IDentification (RFID) reader and each of the one or more EIDs comprises an RFID tag associated with an item.

3. The method of claim 2, wherein the sensor is located at a retail establishment.

4. The method of claim 1, further comprising determining a number of EIDs located in the vicinity of the sensor based on the identification information.

5. The method of claim 4, further comprising:
   selectively adjusting the transmission power to the sensor based on the number of EIDs located in the vicinity of the sensor, in response to determining that the number of EIDs exceeds a second predefined threshold.

6. The method of claim 1, wherein the sensor comprises a gate assembly including a door of a retail establishment movable between an open position allowing passage of an item along a path and a closed position inhibiting passage of the item along the path, and wherein the gate assembly is associated with one or more Radio Frequency IDentification (RFID) readers.

7. The method of claim 1, wherein the first predefined threshold is selected based on an optimized performance of the sensor.

8. The method of claim 1, wherein selectively adjusting the transmission power comprises scheduling one or more selective adjustments of the transmission power based on a scheduling strategy.

9. A system comprising:
   a hardware processor; and
   a memory including instructions that, when executed by the hardware processor, cause the system to:
     receive identification information from one or more electronic identification devices (EIDs) located in a vicinity of a sensor;
     determine a number of alarms triggered by the one or more EIDs located in the vicinity of the sensor during a predetermined period of time based on the identification information;

determine if the number of alarms exceeds a first predefined threshold; and selectively adjust a transmission power to the sensor based on the number of alarms with respect to the first predefined threshold, in response to determining that the number of alarms exceeds the first predefined threshold.

10. The system of claim 9, wherein the sensor comprises a Radio Frequency IDentification (RFID) reader and each of the one or more EIDs comprises an RFID tag associated with an item.

11. The system of claim 10, wherein the sensor is located at a retail establishment.

12. The system of claim 9, wherein the instructions further cause the system to determine a number of EIDs located in the vicinity of the sensor based on the identification information.

13. The system of claim 12, wherein the instructions further cause the system to selectively adjust the transmission power to the sensor based on the number of EIDs located in the vicinity of the sensor, in response to determining that the number of EIDs exceeds a second predefined threshold.

14. The system of claim 9, wherein the sensor comprises a gate assembly including a door of a retail establishment movable between an open position allowing passage of an item along a path and a closed position inhibiting passage of the item along the path, and wherein the gate assembly is associated with one or more Radio Frequency IDentification (RFID) readers.

15. The system of claim 13, wherein the first predefined threshold is selected based on an optimized performance of the sensor.

16. The system of claim 9, wherein the hardware processor configured to selectively adjust the transmission power is further configured to schedule one or more selective adjustments of the transmission power based on a scheduling strategy.

* * * * *